United States Patent [19]

Herwig et al.

[11] Patent Number: 4,641,330

[45] Date of Patent: Feb. 3, 1987

[54] HIGH VOLTAGE SUPPLY CIRCUIT FOR AN X-RAY TUBE

[75] Inventors: Thomas Herwig, Eltville; Georg Geus, Wiesbaden, both of Fed. Rep. of Germany

[73] Assignee: Heimann GmbH, Fed. Rep. of Germany

[21] Appl. No.: 763,425

[22] Filed: Aug. 7, 1985

[30] Foreign Application Priority Data

Aug. 23, 1984 [DE] Fed. Rep. of Germany ....... 3431082

[51] Int. Cl.$^4$ .......................... H05G 1/32; H05G 1/20
[52] U.S. Cl. .................................... 378/101; 378/105; 363/41
[58] Field of Search ............... 378/101, 104, 106, 105, 378/109–110; 363/41

[56] References Cited

U.S. PATENT DOCUMENTS

| | | | |
|---|---|---|---|
| 4,266,134 | 5/1981 | Franke et al. | 378/105 |
| 4,424,557 | 1/1984 | Steigerwald | 363/41 |
| 4,486,824 | 12/1984 | Okuyama et al. | 363/41 |
| 4,504,895 | 3/1985 | Steigerwald | 378/105 |

FOREIGN PATENT DOCUMENTS 0147698 7/1985 European Pat. Off. ............ 378/101

*Primary Examiner*—Craig E. Church
*Assistant Examiner*—Charles Wieland
*Attorney, Agent, or Firm*—Hill, Van Santen, Steadman & Simpson

[57] ABSTRACT

A high voltage supply circuit for an X-ray tube inclues a high voltage transformer having a primary side driven by voltage pulses generated by a drive circuit. The drive circuit includes sub-circuits for controlling the pulse repetition frequency, which is selected as equal to a parallel resonant frequency of a high voltage generator connected to the secondary side of the transformer, for the purpose of saving energy. The drive circuit also includes a sub-circuit for controlling the pulse duration, with the filament voltage in the X-ray tube being regulated by this pulse duration.

5 Claims, 2 Drawing Figures

HIGH VOLTAGE SUPPLY CIRCUIT FOR AN X-RAY TUBE

BACKGROUND OF THE INVENTION

1. Field of the Invention

The present invention relates to high voltage supply circuits for an X-ray tube, and in particular to high voltage supply circuits including means for operation at a frequency selected between a resonant frequency of the high voltage generator and the pulse repetition frequency of a pulse generator.

2. Description of the Prior Art

A high voltage supply for an X-ray tube is described in German OS No. 28 02 513 which includes a pulse generator and a high voltage generator. The high voltage generator has a high voltage transformer therein and also includes circuitry for balancing the pulse frequency between a resonant frequency of the high voltage generator and the pulse repetition frequency of the pulse generator. This supply circuit further has devices for regulating the amplitude of the high voltage at the high voltage transformer. In this known high voltage supply circuit, capacitors and inductive components are connected in steps to the primary side of the high voltage transformer in order to achieve balancing of the resonant frequency with the generator frequency. Such balancing results in a relatively high material outlay, and presents the possibility for increased susceptibility to disruption of the circuit operation by the environment.

SUMMARY OF THE INVENTION

It is an object of the present invention to provide a high voltage supply circuit for an X-ray tube including means for balancing the resonant frequency of the high voltage generator and the pulse generator frequency of the drive circuit in a simple manner which is relatively insusceptible to disruption by external influences.

The above object is inventively achieved in a high voltage supply circuit wherein the amplitude of the high voltage is regulated by varying the pulse duration, or pulse duty factor, rather than by regulating the pulse repetition frequency. Because the pulse repetition frequency plays no part in regulating the amplitude of the filament voltage, the pulse repetition frequency thus becomes a "free parameter" within certain limits, and can be optimized for other purposes, such as energy savings.

Balancing to the resonant frequency is achieved by varying the pulse repetition frequency until the peak value of the drive current at the output of the drive circuit reaches a minimun. The resonant frequency of the parallel resonance condition is thus identified in a simple manner. This balancing method also permits a voltage transformer to be connected between the drive circuit and the high voltage generator, the voltage transformer having its drive current rise with the current taken at the output side. An electronic following of the generator frequency can thus be achieved without difficulty. This is of particular advantage when a change in the resonant frequency is to be expected during operation.

DESCRIPTION OF THE PREFERRED EMBODIMENTS

Figure 1:
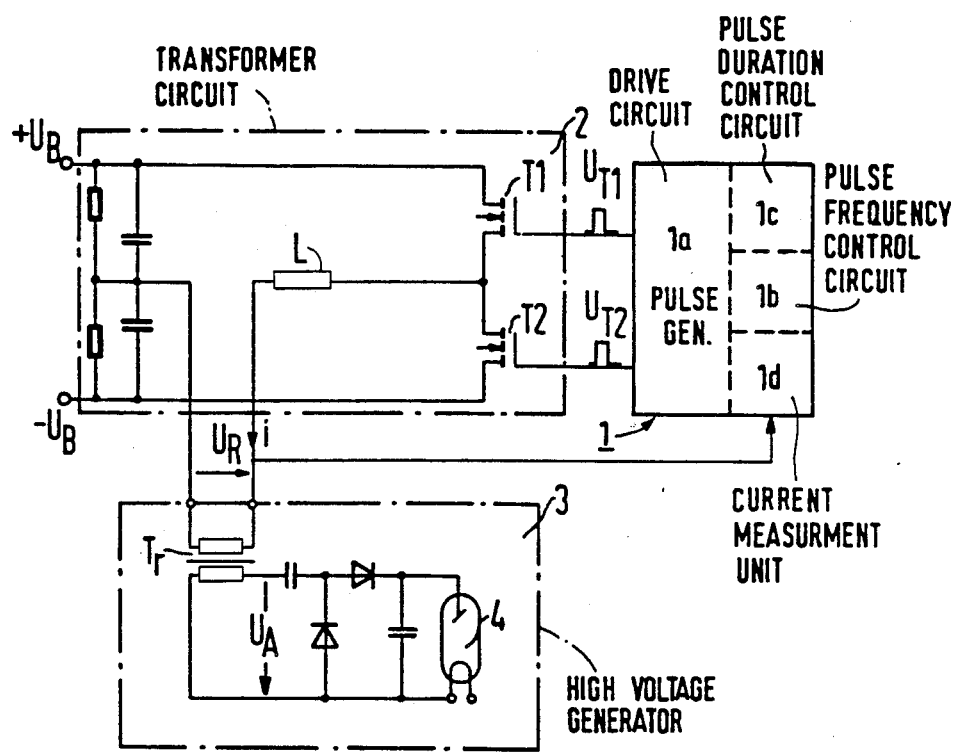
FIG. 1 is a schematic circuit diagram of a high voltage supply circuit for an X-ray tube constructed in accordance with the principles of the present invention.

A high voltage supply circuit for generating a filament voltage and current for an X-ray tube is schematically shown in FIG. 1. The circuit includes a drive circuit, generally referenced at one, which has a pulse generator 1a for generating voltage pulses $U_{T1}$ and $U_{T2}$. The pulse generator 1a is controlled by a pulse frequency control circuit 1b and a pulse duration, or duty factor, control circuit 1c. The pulses $U_{T1}$ and $U_{T2}$ are respectively supplied to the control electrodes of transistors T1 and T2 in a transformer circuit 2. The transformer circuit 2 generates bipolar pulses having a current i which is supplied to the primary winding of a high voltage transformer Tr in a high voltage generator 3. The current i is measured by a current measuring unit 1d, which is shown in the embodiment of FIG. 1 as part of the drive circuit 1, but which can be any suitable current measuring means well known to those skilled in the art. The peak value of the measured current i is regulated to a minimum by varying the pulse repetition frequency of the drive circuit. For this purpose, the current measuring circuit 1d provides a signal to the pulse frequency control circuit 1b. Subsequently, the voltage of the resonant frequency at the transformer, indicated by the resonant voltage $U_R$ in FIG. 1, and thus the supply voltage for the X-ray tube 4 are brought to a desired level by varying the pulse duty factor of the pulses supplied by the drive circuit 1. This is achieved solely by the pulse duration control circuit 1c, with only the pulse width being adjusted and the pulse repetition frequency is not varied for that purpose.

Figure 2:
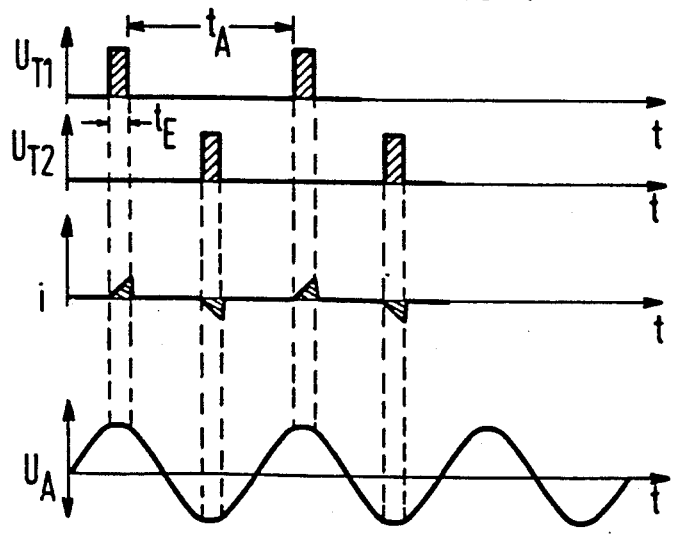
FIG. 2 is a voltage/time diagram showing the waveforms for various signals in the circuit of FIG. 1.

The resonant voltage $U_R$ is an attenuated or damped oscillation. In a standard design of the high voltage generator 3, the resonant voltage $U_R$ has an approximately sinusoidal curve, as is shown in FIG. 2. The current i generated by the pulses $U_{T1}$ or $U_{T2}$ is representative of the power consumed in the high voltage generator 3 and in the X-ray tube 4, but does not have any significant reactive current components.

As shown in the drawing, the circuit of FIG. 1 employs field effect transistors T1 and T2. This embodiment represents a simple construction, requires less drive power, and is particularly suitable for one-time adjustment of the resonant frequency $U_R$. In applications wherein the resonant frequency is to be readjusted, the transistors T1 and T2 can be replaced by known transistor circuits having a load-dependent base current. In this case, the base current can be sampled as a measure for the pulse current at the output of the drive circuit 1 for directly identifying the aforementioned minimum current of the pulses.

In the high voltage generator 3, the transformer Tr is directly followed by a single-stage voltage multiplication cascade. A doubling of the transformer voltage $U_A$ results therefrom. As needed, multi-stage voltage multiplication cascades can be utilized.

The high voltage generator 3 is combined in a common housing with the X-ray tube 4 in standard fashion, so as to be protected against the influence of external alternating fields, with the housing providing further protection against the emergence of undesired radiation. In such embodiments, the circuit disclosed herein has the further advantage that no increased sensitivity to such external influences on the resonant frequency need be accepted due to a balancing between the resonant frequency of the high voltage generator 3 and the pulse repetition frequency of the drive circuit 1, as would be the case in conventional circuits wherein such balancing is achieved by externally connected balancing components such as capacitors and inductive devices.

A particular advantage of the circuit disclosed above is that the balancing between the resonant frequency and the generator frequency can be undertaken continuously during operation of the X-ray installation without switchover peaks of the current or of the voltage or undefined oscillatory conditions. Such conditions arise in conventional circuits when balancing is undertaken by means of switched capacitors.

Although modifications and changes may be suggested by those skilled in the art it is the intention of the inventors to embody within the patent warranted hereon all changes and modifications as reasonably and properly come within the scope of their contribution to the art.

We claim as our invention:

1. In a high voltage supply circuit for an X-ray tube having a pulse generator and a high voltage generator including a high voltage transformer, the improvement comprising:
    a drive circuit for said supply circuit including said pulse generator and having means connected to said pulse generator for controlling the pulse frequency of pulses generated by said pulse generator and means connected to said pulse generator for independently controlling the pulse duration of pulses generated by said pulse generator, said means for controlling the pulse frequency initially selecting a pulse frequency for said pulse generator and said means for controlling said pulse duration thereafter regulating the amplitude of the voltage at said high voltage transformer by controlling only said pulse duration.

2. A circuit as claimed in claim 1 further comprising means for measuring the current at a primary side of said transformer, said means for measuring said current being connected to said means for controlling the pulse frequency for minimizing a peak value of the measured current solely by varying the pulse repetition frequency.

3. A circuit as claimed in claim 2 further comprising a transformer circuit interconnected between said drive circuit and said high voltage generator, said transformer circuit having an input current which increases as its output current increases.

4. A method for operating a high voltage supply circuit for an X-ray tube having a pulse generator and a high voltage transformer driven by said pulse generator comprising the steps of:
    measuring the peak value of the current in the primary winding of said high voltage transformer;
    varying the pulse repetition frequency of pulses generated by said pulse generator for minimizing said peak value of said measured current; and
    thereafter controlling the output voltage of said high voltage transformer solely by selectively varying the pulse duration of pulses generated by said pulse generator at a constant pulse repetition frequency.

5. A method as claimed in claim 4 comprising the additional step of:
    continuously monitoring said current in said primary winding and correspondingly adjusting the pulse repetition frequency for continually minimizing said peak value under changing load and voltage conditions.

* * * * *